United States Patent [19]
Sanders

[11] 3,917,198
[45] Nov. 4, 1975

[54] OVERWING POST EXIT BLOCKER/DEFLECTOR DOOR THRUST REVERSER

[75] Inventor: Dennis E. Sanders, San Diego, Calif.
[73] Assignee: Rohr Industries, Inc., Chula Vista, Calif.
[22] Filed: June 21, 1974
[21] Appl. No.: 481,525

[52] U.S. Cl. ....... 244/110 B; 60/226 A; 239/265.19; 244/53 R
[51] Int. Cl.² .......................................... B64C 15/08
[58] Field of Search ............ 244/110 B, 12 D, 23 D, 244/52, 53 R; 239/265.19, 265.27, 265.29, 265.37, 265.41; 60/226 A, 229, 230

[56] References Cited
UNITED STATES PATENTS

| | | | |
|---|---|---|---|
| 3,028,730 | 4/1962 | Clark | 239/265.41 X |
| 3,280,561 | 10/1966 | Kutney | 239/265.19 X |
| 3,519,207 | 7/1970 | Clough | 239/265.41 |
| 3,690,561 | 9/1972 | Potter | 239/265.37 X |
| 3,844,482 | 10/1974 | Stearns | 239/265.37 |

Primary Examiner—Trygve M. Blix
Assistant Examiner—Barry L. Kelmachter
Attorney, Agent, or Firm—Patrick J. Schlesinger; Jay D. Gordon; Frank D. Gilliam

[57] ABSTRACT

A thrust reverser for utilization on a wing mounted jet powered aircraft in which all exhaust gases are discharged over the wing thereof. The jet engine is housed in a nacelle which has inner and outer skins and which is affixed to the forward edge of the wing. The lower portion of the nacelle is contoured to form a continuous aerodynamic profile with the wing. The thrust reverser is comprised of a deflector door stowed in and forming part of the aerodynamic profile of the nacelle. An actuating member is active to rotate a drive link which action simultaneously causes the deflector door to rotate to an airstream diverting position and to translate the same to a position aft of the nacelle. The deflector door includes linkage which rides in guide tracks to control the motion of the deflector door. A blocker door is pivotally connected to the deflector door and activated thereby to rotate it to its deployed position. The blocker door is pivotally connected to the tracking linkage which linkage is pivoted to the wing structure.

8 Claims, 3 Drawing Figures

OVERWING POST EXIT BLOCKER/DEFLECTOR DOOR THRUST REVERSER

BACKGROUND OF THE INVENTION

The present invention relates to a thrust reverser for use with a wing mounted jet engine.

There is presently a rather substantial interest in vertical and short take-off and landing aircraft sometimes known as STOL and VTOL aircraft. Such craft would permit airports to be located closer to the centers of major cities and alleviate the problems that presently exist in traveling from the city to the airport.

A popular contemporary STOL configuration under consideration by airframe manufacturers is the connection of the power plant on the wings, the wings being swingable to a vertical or take-off position. This requires that the power plant be connected directly to the forward edge of the wing rather than being suspended therefrom by means of a pylon.

In one such embodiment, thrust reversal during ground roll is accomplished by an aft tilt wing portion which is swingable to vertical, thrust blocking position. This mechanism is somewhat undesirable since it necessitates structural complications of the wings of the aircraft. It has been demonstrated that the performance of most jet aircraft is superior when the reversing structure is divorced from the wings.

In other prior art embodiments the engines are mounted under the wing to provide for greater lift thereon. The reversing apparatus is included within the confines of the wing and is selectively activated by the pilot. It should be evident that this arrangement is inefficient since not all the exhaust gases are redirected through the reverser.

Another prior art structure is directed toward an engine which is mounted to the forward edge of the wing but discharges exhaust gases both over and under the wing. Two separate reverser mechanisms are necessary in this embodiment resulting in a duplication of deflecting and actuating structure. As applied to aircraft, the duplication of any equipment is undesirable particularly since it tends to increase the weight of the craft.

The present invention is effective to control the thrust reversing requirements of wing mounted jet aircraft. The apparatus is characterized by efficient action and effective reversal of thrust.

SUMMARY OF THE INVENTION

The thrust reverser of this wing mounted jet engine comprises a deflector door with depending side flaps, which door is stowed as part of the aerodynamic profile of the nacelle. Drive links are pivoted to the fore corners of the flaps, to the wing structure and are acted up by an actuator mechanism. The aft corners of the flaps include roller bearings which ride within guide rails so that the pivotal and translation motion of the deflector door is controlled, with the fully deployed position being aft of the nacelle in a position to intercept the airstream and partially divert it.

A blocker door is stowed adjacent the wing and has its leading edge pivotally connected to the trailing edge of the side flaps. The trailing edge of the blocker door is pivotally connected to a trailing link which in turn is pivoted to part of the wing structure. The movement of the deflector door counter pivots the blocker door to its deployed or jamming position in which it essentially traverses the air stream and in which its trailing edge sealingly engages the deflector door. The off-center stowed connection between the blocker door and trailing link insures that there can be no dead center condition in which the parts will be locked.

The above and other aspects of the instant invention will be apparent as the description continues and when read in conjunction with the appended drawings.

DESCRIPTION OF THE DRAWINGS

As illustrated in FIG. 1, a nacelle 10 is suitably mounted to the leading edge of wing 12. The lower portion 14 of the nacelle is contoured so as to conform to aerodynamic profile of the wing structure, and it is seen that the nozzle 16 discharges only over the upper surface of the wing. An engine 18 is housed and suitably supported in the nacelle 10.

Figure 1:
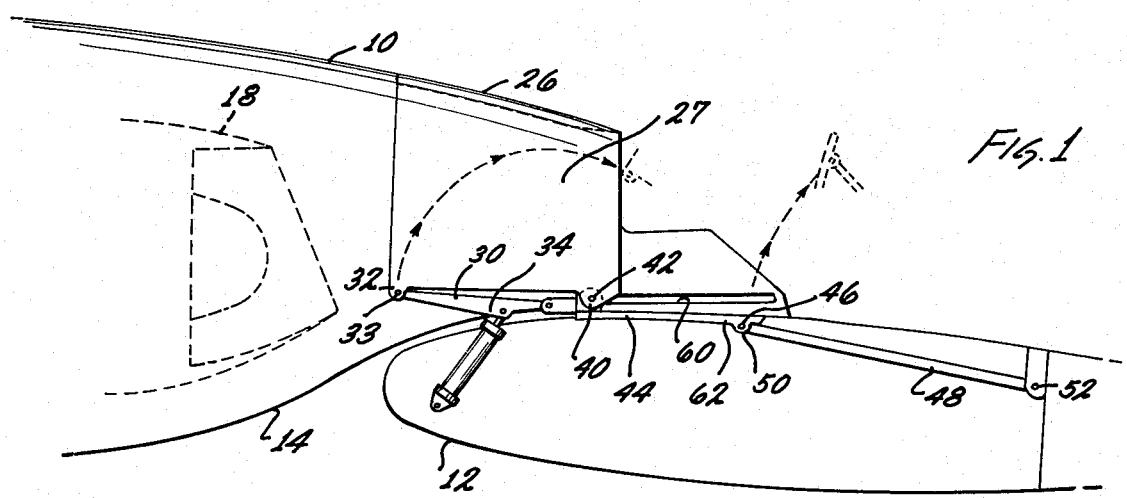
FIG. 1 is a semi-diagrammatic elevational view of the reverser apparatus embodying principals of the instant invention shown in its stowed position.
Figure 2:
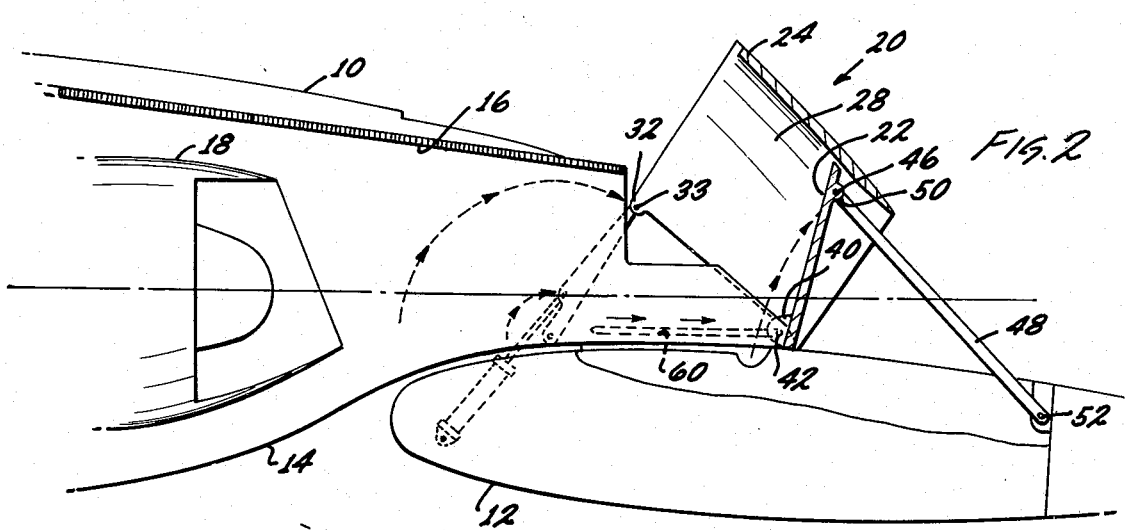
FIG. 2 is a view similar to FIG. 1, showing the apparatus in deployed position.
Figure 3:
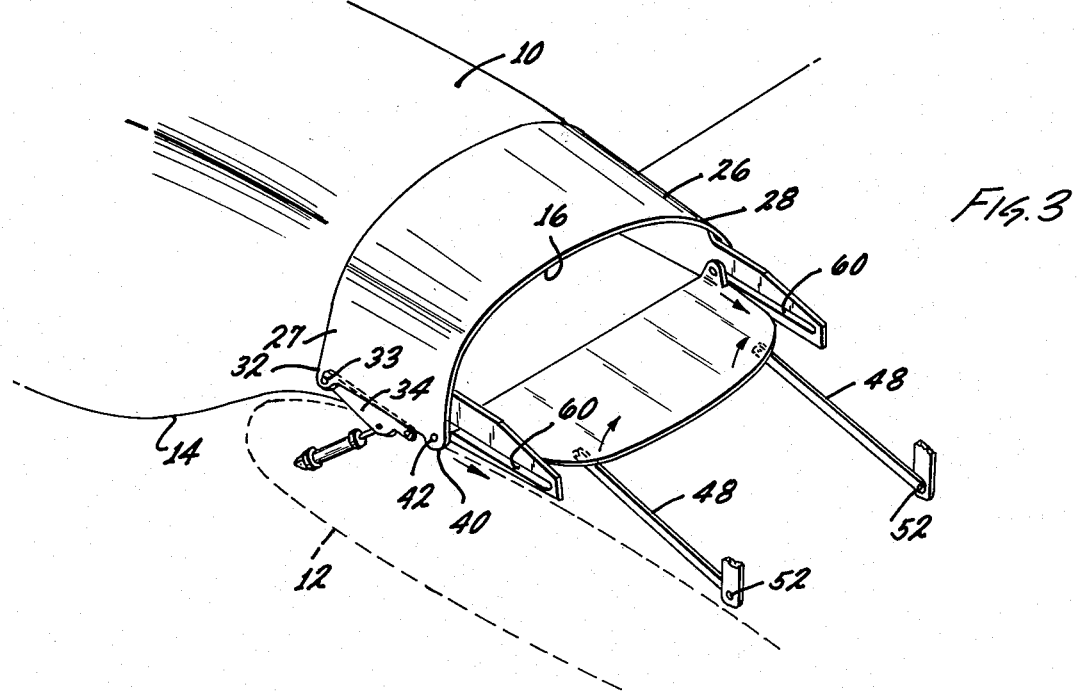
FIG. 3 is a perspective view of the apparatus shown in stowed condition.

The nacelle herein disclosed can be utilized on STOL aircraft which are characterized by very short take-off and landing runs. There have been many variations of these planes, some of which are capable of hovering much as a helicopter. By proper orientation of the engine exhaust relative to the upper wing surface, the exhaust gas forms a thick boundary layer which can be made to adhere to the wing surface through a proper profile. By continuing this profile to the point that the velocity vector is directed downward, a net thrust upward is created which is additive to the normal wing lift due to accellerated flow over the upper surface. The profile continuation, being required only during landing and take-off, is achieved by suitable flap extensions. The structure hereinafter described and claimed is not to be strictly limited to a particular STOL concept. It is merely desired to frame this invention in a representative environment for ease of description. In fact, it should be readily understood that the apparatus of the instant invention is not limited to STOL aircraft but may be utilized wherever the aerodynamic considerations demand its usage.

The reverser apparatus 20 deploys aft of the nozzle 16. The airstream is turned in several stages; it is jammed by means of a blocker door 22; and, it is turned into a forward component by means of deflector door 24.

The deflector door 24 is stowed in a notch 26 in the nacelle 10. That deflector door had depending side flaps 27, 28 which depend down to adjacent the wing 12. The side flaps 27, 28 are included so as to seal the sides of the reverser from leakage therethrough.

A driver link 30 is pivoted at 32 to the nacelle 10. Its forward end 34 is pivoted to the forward bottom corner of the side flap 27 by means of a coupler section 32 which may be integrally formed with the side flap 27. A pin may be suitably journaled through holes in the coupler section and the driver link. The driver link includes an integral driver part 34. An actuator (not shown) is pivotally connected to that drive part 34 at 36, again by a suitably journaled pin arrangement. The actuator, which can be any known mechanism, is effective to swing the driver link, clockwise, to its deployed position, wherein it is disposed almost lateral to the airstream flow.

The aft corner of the side flap 27 also includes a coupler piece 40, which likewise may be formed integrally with the flap. The blocker door 22 is pivotally connected to that coupler section at 42, also via a journaled pin arrangement. That blocker door is stowed in a recess in the upper surface of the wing 12, and it is characterized by a coupler section 44 which is pinned at 42. The aft end of the blocker door is pinned at 46 to a trailing link 48, via a coupler 50. That trailing link 48 is pivotally pinned to the wing structure at 52. Identical structure responsible for the deployment of the reverser associated with flap 27, is likewise associated with a flap 28.

The motion of the driver link 33 causes the flap 27 to pivot about point 42. This causes the deflector door 24 to be disposed acutely with respect to the airstream so as to impart a forward component thereto. However, for the reverser to be effective, that deflector door must be translated aft of the nozzle 16. To this end, the flap 27, includes a roller bearing, or other suitable connector, (not shown), which rides in guide track 60, which track is formed in nacelle 10. In this manner, the deflector door is rotated clockwise and simultaneously translated aft to its deployed position.

Since the blocker door 22 is pinned to the flap 27 at 42, it must move to accommodate the movement of that flap. The blocker door 22 is provided with an overlap 62 which acts on trailing link 48 and prevents that blocker door from pivoting clockwise. However, there is no impediment to counterclockwise rotation of the blocker door 22. As a result, the forward end of the blocker door translates aft along with coupler 40 while that door is pivoted to its deployed, thrust jamming position. In that position, the blocker door 22 engages the deflector door 20 so as to prevent the leakage of exhaust gases therebetween.

It should be evident that to return the reverser structure to its stowed position, the actuator pulls on the driver link 30 and the motion of all constituent elements is simple and dependable and the thrust reversal is extremely effective.

Many changes may be made in details of the instant invention, in the method and materials of fabrication, in the configuration and assemblage of the constituent elements, without departing from the spirit and scope of the appended claims, which changes are intended to be embraced therewithin:

I claim:

1. In a thrust reverser utilized on a wing mounted jet engine powered aircraft discharging exhaust gases over the wing thereof, said jet engine housed in a nacelle having inner and outer skins and said nacelle being affixed to the forward part of the wing of the aircraft, the lower portion of the nacelle being appropriately contoured for connection to said wing such that the outer skin on said lower portion forms a continuous aerodynamic profile with said wing, said reverser comprising a deflector door, in the stowed position said deflector door forming a part of the aerodynamic profile of said outer skin of said nacelle, said deflector door having a translatable pivot point for pivoting and translating aft of said nacelle to a deployed position wherein the oncoming airstream is deflected with a forward velocity component, said deflector door including depending side flaps adapted to prevent the passage of exhaust gases through the sides of said reverser, means operatively connected to said flaps to selectively control the pivoting and translating of said deflector door, actuating means active on said linkage means, and effective to pivot said linkage means to its deployed position and said linkage means being operatively connected to said deflector door, a blocker door pivotally connected to said flaps and swingable to a deployed airstream jamming position, the rotation of said blocker door being counter to the rotation of said deflector door.

2. In the reverser of claim 1, a trailing link pivoted to said wing structure and also pivoted to said blocker door, said trailing link and said blocker door being joined such that said trailing link rotates in the same direction as said deflector door.

3. In the reverser as recited in claim 1, said means to control the pivoting and translating of said deflector door comprises a guide track and roller bearing means movably positioned therein.

4. In the reverser of claim 1, the trailing tip of said blocker door engages the inner skin of said deflector door in a substantially air tight engagement.

5. In the reverser of claim 1, said deflector door is stowed in a notch in the external skin of said nacelle.

6. In a thrust reverser utilized on a wing mounted jet engine powered aircraft discharging exhaust gases over the wing thereof, said jet engine housed in a nacelle having inner and outer skins and said nacelle being affixed to the forward part of the wing of the aircraft, the lower portion of the nacelle being appropriately contoured for connection to said wing such that the outer skin on said lower portion forms a continuous aerodynamic profile with said wing, said reverser comprising a deflector door, in the stowed position said deflector door forming a part of the aerodynamic profile of the outer skin of said nacelle, said deflector door having a rearward translatable pivot connection to said nacelle so that said deflector door is pivotable and translatable aft of said nacelle to a deployed position wherein the oncoming airstream is deflected with a forward velocity component, said deflector door including depending side flaps adapted to prevent the passage of exhaust gases through the sides of said reverser, a blocker door pivotally connected to said translatable pivot connection and swingable to a deployed airstream jamming position, the rotation of said blocker door being counter to the rotation of said deflector door and means operatively connected to said flaps to selectively control the pivoting and translating of said deflector door and said blocker door.

7. The reverser of claim 6, said translatable pivot connection comprises a pivot point on each side of said deflector door on said flaps the pivot points are confined and guided in their translating movement by longitudinal slots in said nacelle.

8. The reverser of claim 6, said means operatively connected to said deflector door and said blocker door comprises an actuating means connected at one end thereof to said wing and the other end to said deflector door through a drive linkage, said blocker door is carried rearward by said deflector door and pivoted upward by a trailing linkage, said pivotable link is pivotally connected at the end to said blocker door remote from said translatable pivot point and the other end connected to said wing.

* * * * *